Dec. 5, 1961 C. W. HEATH 3,011,743
MEANS FOR MOUNTING AN ARTICLE IN AN APERTURE IN A SUPPORT
Filed March 2, 1959

INVENTOR
CLARENCE WILLANS HEATH,
BY Philip E. Parker

ATTORNEY

United States Patent Office 3,011,743
Patented Dec. 5, 1961

3,011,743
MEANS FOR MOUNTING AN ARTICLE IN AN APERTURE IN A SUPPORT
Clarence Willans Heath, Bleasby, England, assignor to United-Carr Fastener Corporation, New Castle, Del., a corporation of Delaware
Filed Mar. 2, 1959, Ser. No. 796,498
Claims priority, application Great Britain Mar. 20, 1958
2 Claims. (Cl. 248—27)

This invention relates to means for mounting an article in an aperture in a support.

It is an object of the present invention to provide a means of securing an article, for example a lampholder, in an aperture in a support which is cheap to manufacture, easily assembled and which does not involve the use of bolts or screws.

The present invention comprises the assembly of a support having an aperture and a socket mounted in the aperture, the socket comprising a sleeve made of resilient material and having a preformed flange at least a portion of which extends radially outwardly from one end of the sleeve to overlap one face of the support adjacent the edge of the aperture, the opposite end of the sleeve being deformed after assembly with the support by application of heat and pressure to form a radially outwardly extending flange overlapping the opposite face of the support adjacent the edge of the aperture, the sleeve having means for engaging an article inserted therein.

The invention also includes a socket for mounting an article in an aperture in a support, the socket comprising a sleeve made of resilient material and adapted to be positioned in the said aperture and secured by parts at each end of the sleeve extending radially outwardly to overlap opposite faces of the support, the inner surface of the sleeve having means for making frictional engagement with an article inserted therein.

The article engaging means may comprise, for example, one or more resilient ribs extending longitudinally of the sleeve, and spaced equally around the internal circumference of the sleeve. The wall of the sleeve between the ribs is preferably thin to give a greater resiliency to the sleeve.

One embodiment of the present invention will now be described, by way of example only, with reference to the accompanying drawing of which, FIG. 1 is a side elevation of an assembly according to one embodiment of the invention, for mounting a lampholder in an apertured support;

Figure 1:
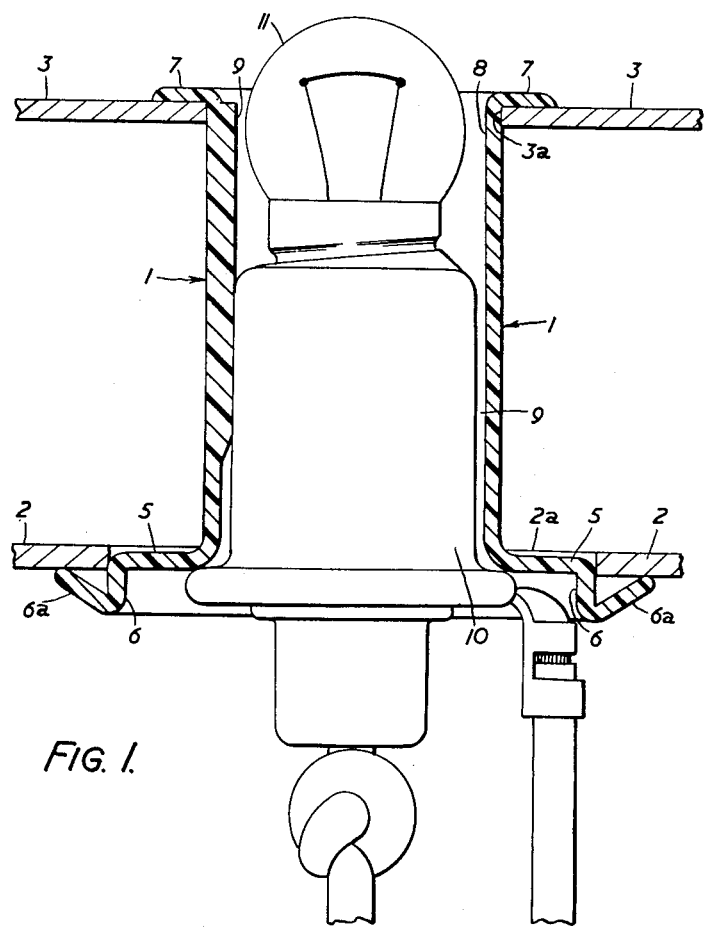
Figure 2:
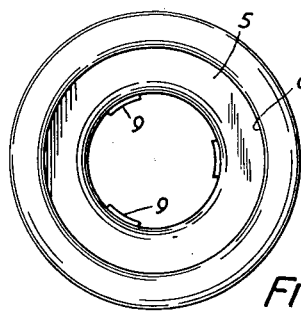
FIG. 2 is an under plan view of the socket of FIG. 1.
Figure 3:
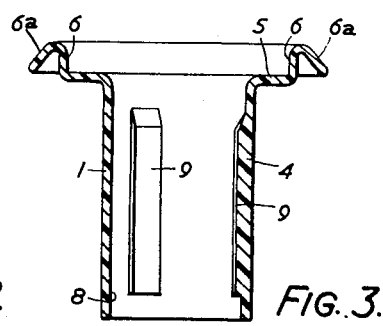
FIG. 3 is a sectional side view of the socket before assembly with the support.

With reference to the accompanying drawing, the socket comprises a cylindrical sleeve 1 of resilient synthetic plastic material mounted in an aperture in a support comprising a pair of plate-like members 2, 3, each having an aperture 2a, 3a, the aperture 2a being of greater diameter than the aperture 3a. The sleeve 1 has a cylindrical portion 4, and at one end has a resilient preformed flange 5 which includes a longitudinally extending portion 6 lying radially outwardly of the cylindrical portion 4 of the sleeve 1 and a rearwardly and radially outwardly extending portion 6a.

On insertion of the sleeve 1 into the aperture from the bottom as shown in FIG. 1, the cylindrical portion 4 extends through the aperture such that the longitudinally extending portion 6 of the flange 5 is in contact with the edge of the aperture 2a and the radially extending portion 6a of the flange 5 is resiliently in contact with the adjacent face of the support member 2. The sleeve 1 is secured in the aperture by forming a flange 7 using a heated punch to apply heat and pressure to turn over that end of the sleeve 1. The longitudinally extending portion 6 of the flange 5 assists in locating the sleeve 1 in the aperture 2a and the outer portion 6a besides retaining the sleeve 1 in the aperture also acts as a dust seal.

The internal wall 8 of the sleeve 1 has three ribs 9 extending longitudinally of the sleeve 1 and spaced at equal intervals around the internal circumference. The internal wall 8 is made very thin such that when a cylindrical article, for example a lampholder 10 which has an external diameter slightly greater than the minimum diameter of the circle formed by the inner faces of the three ribs 9, will be frictionally secured in the sleeve 1, the thin wall 8 allowing for expansion on insertion of the lampholder 10. As shown, a lamp 11 is secured in the lampholder 10.

The lampholder 10 or like article is thus frictionally held in the sleeve 1, and yet may be easily inserted on assembly or withdrawn for replacement.

It will be understood that the sleeve may be formed of any resilient material which in its final form can be moulded to form the flange 7.

I claim:

1. A mounting device comprising, in combination, a resilient pliable sleeve member connecting a pair of apertured spaced supports, said sleeve member having an outwardly extending flange at one end being in frictional engagement with the side walls of one apertured support, said flange having angularly extending distal end portions bearing on the outer surface of said support, the opposite end of said sleeve member deformed into engagement with the outer face of said second support whereby said sleeve defines a continuous dustproof passage between said supports.

2. A mounting device as set forth in claim 1, where said sleeve member has a plurality of longitudinally extending rib portions formed on the inner surface thereof defining a reduced cross-sectional area therein, whereby an article positioned within said sleeve will be retained in frictional engagement maintaining a floating relationship between said panels.

References Cited in the file of this patent

UNITED STATES PATENTS

| | | |
|---|---|---|
| 2,169,965 | Niedermaier | Aug. 15, 1939 |
| 2,424,804 | De Swart | July 29, 1947 |
| 2,426,552 | Ge Wertz | Aug. 26, 1947 |
| 2,799,528 | Wilfert | July 16, 1957 |
| 2,860,233 | Johnson | Nov. 11, 1958 |